(12) United States Patent
Tani et al.

(10) Patent No.: US 8,716,179 B2
(45) Date of Patent: May 6, 2014

(54) ADHESIVE LABEL AND LABEL ISSUING DEVICE

(75) Inventors: Kazuo Tani, Chiba (JP); Norimitsu Sanbongi, Chiba (JP); Yoshinori Sato, Chiba (JP)

(73) Assignee: Seiko Instruments Inc. (JP)

( * ) Notice: Subject to any disclaimer, the term of this patent is extended or adjusted under 35 U.S.C. 154(b) by 76 days.

(21) Appl. No.: 13/414,785

(22) Filed: Mar. 8, 2012

(65) Prior Publication Data
US 2012/0231950 A1 Sep. 13, 2012

(30) Foreign Application Priority Data

Mar. 10, 2011 (JP) .................................. 2011-053463

(51) Int. Cl.
*B41M 5/42* (2006.01)
*G09F 3/02* (2006.01)

(52) U.S. Cl.
USPC ......................................................... 503/226

(58) Field of Classification Search
USPC .................................................. 503/200–226
See application file for complete search history.

(56) References Cited

U.S. PATENT DOCUMENTS

2010/0300613 A1 12/2010 Stogbauer et al. ............. 156/256

FOREIGN PATENT DOCUMENTS

| EP | 2431963 | 3/2012 |
|----|---------|--------|
| JP | 09111203 | 4/1997 |
| JP | 2006078733 | 3/2006 |
| JP | 2006084607 | 3/2006 |

*Primary Examiner* — Bruce H Hess
(74) *Attorney, Agent, or Firm* — Adams & Wilks

(57) ABSTRACT

An adhesive label has a support, an adhesive layer placed on the support, and a stretched non-adhesive porous layer placed on the adhesive layer and being openable by heating to expose the adhesive layer.

20 Claims, 3 Drawing Sheets

FIG.1
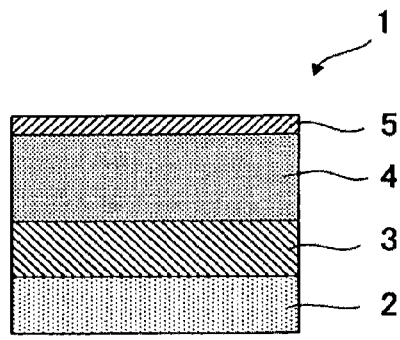
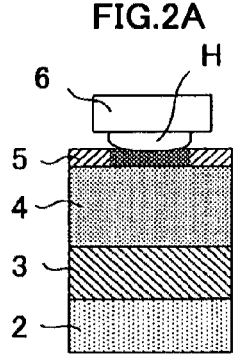 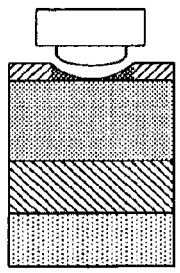 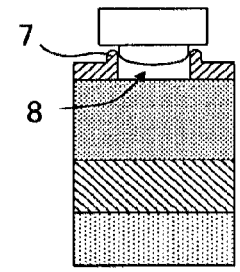 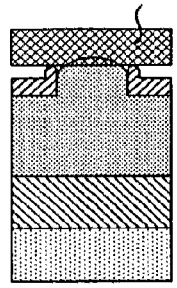
FIG.2A FIG.2B FIG.2C FIG.2D
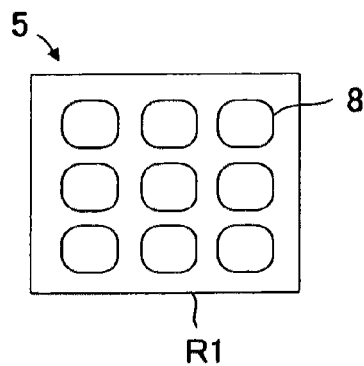 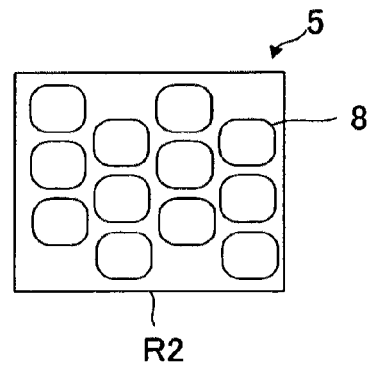
FIG.3A FIG.3B

ADHESIVE LABEL AND LABEL ISSUING DEVICE

BACKGROUND OF THE INVENTION

1. Field of the Invention

The present invention relates to an adhesive label that has non-adhesiveness at a time of storage and is allowed to exhibit adhesiveness at a time of use.

2. Description of the Related Art

In recent years, adhesive labels have been used for a price indication label, a product indication label, an advertisement label, a seal label for a package, and the like. As a method of recording on a recording surface of the adhesive label, various methods such as an inkjet recording method and a thermosensitive recording method are applied. Conventionally, the adhesive label has a configuration in which an adhesive layer and release paper are laminated on a surface opposite to the recording surface for characters and the like. The release paper is peeled off at a time of use to expose the adhesive layer, and the adhesive label is attached by pressing. However, in the conventional adhesive label to be used by peeling off the release paper, the release paper after being peeled off from the adhesive label completes its function and is disposed of as waste. Therefore, there is a demand for an adhesive label that does not create waste of release paper from the viewpoint of resource protection and environment.

In order to solve the above-mentioned problem, a label that does not use release paper has also been proposed. Specifically, there has been proposed a label in which a thermosensitive adhesive layer that has non-adhesiveness at room temperature and exhibits adhesiveness by heating is formed on a surface opposite to a printed surface of a label. In this label, release paper is not required, and hence, problems related to environment and waste as in the related art do not arise. However, the label in which the thermosensitive adhesive layer is formed is stored by being rolled into a roll shape or by being stacked, and hence, the adhesive surface and the printed surface are stacked on one another in contact. Therefore, in the case of long-term storage or depending upon storage environment, there is a problem of so-called blocking, in which the thermosensitive adhesive exhibits slight adhesiveness, and this causes the printed surface and the adhesive surface to adhere to each other. Further, as heating means for exhibiting adhesiveness by using an adhesive, it is considered to use a heat source such as a thermal head. However, when the thermal head is used for allowing the thermosensitive adhesive layer to exhibit adhesiveness by heating in addition to printing, there arises a problem that power consumption increases.

Japanese Patent Application Laid-open No. 2006-78733 describes an adhesive label that does not use release paper and solves the problems such as blocking. As illustrated in FIG. 7 (FIG. 2 of Japanese Patent Application Laid-open No. 2006-78733), the adhesive label 100 has a laminated structure in which a base 101, an adhesive 102, and a resin film 103 are laminated. A polyester film is used as the resin film 103, and the resin film 103 has a thickness of 1 to 3 µm. The adhesive label 100 prevents blocking at a time of storage by covering the surface of the adhesive 102 with the resin film 103 instead of release paper or a thermosensitive adhesive. Then, at a time of use, a hole is opened in the resin film 103 by using a needle 110, or a stretched polyester film is used as the resin film 103 and a hole is opened in the resin film 103 by heating with a thermal head or the like, to thereby break a blocking prevention function and expose the underlying adhesive 102. In this manner, adhesive strength is exhibited.

Further, Japanese Patent Application Laid-open No. 9-111203 describes a configuration in which a pressure-sensitive adhesive layer is provided on a base sheet, and the pressure-sensitive adhesive layer is covered with a microcapsule layer so as to cover an adhesive surface of the pressure-sensitive adhesive layer, to thereby solve the problems such as blocking without using release paper. The microcapsule layer is formed of a single layer of a hollow microcapsule and has a melting point of about 100° C. to 180° C., for example, and the surface thereof has no adhesiveness. Therefore, release paper is not required. At a time of use, the microcapsule layer is broken by heating with a thermal head to expose the underlying pressure-sensitive adhesive layer, and thus, adhesiveness is exhibited.

Regarding the adhesive label described in Japanese Patent Application Laid-open No. 2006-78733, when labels are issued continuously, the labels are allowed to pass under a state in which the resin films 103 that are adhesive surfaces of the labels are brought into contact with a roller having a needle-shaped surface. With this, a hole is opened in each resin film 103 to expose an adhesive. However, the adhesive adheres to the needle 110 when the hole is opened in the resin film 103, and if the roller is rotated, the resin film 103 is pulled to be broken further. Therefore, the position and area of a region in which adhesiveness is to be exhibited cannot be controlled with high precision. In addition, the adhesive 102 and the resin film 103 scatter and adhere to the roller or the inside of the device, which makes it difficult to keep the transportability of the label. Further, in the case of using a stretched polyester film as the resin film 103 and opening a hole in the resin film 103 by heating with a thermal head, the polyester film in direct contact with a heating part is melted to be opened, and the underlying adhesive functions so as to prevent the opening. The adhesive 102 is originally used for acting on an adherend, but in this case, the adhesive function works strongly with respect to the upper polyester film, which hinders the deformation and flowing of the film in contact. Therefore, it is difficult to stably form an opening in a required shape. When the heat energy at a time of heating is increased, the shape of an opening of the polyester film becomes further unstable, and the underlying adhesive is also heated to break the polyester film and scatter the broken strips thereof, which is not practical.

Further, in Japanese Patent Application Laid-open No. 9-111203, the microcapsule has a spherical shape, and hence, the heat conductivity when the microcapsule comes into contact with a heat source is low. Thus, large heat energy is required for breaking the microcapsule. For this reason, the adhesive label of Japanese Patent Application Laid-open No. 9-111203 is not suitable for a label issuing device of a low power consumption type.

SUMMARY OF THE INVENTION

An adhesive label according to the present invention includes: a support; an adhesive layer placed on the support; and a non-adhesive porous layer placed on the adhesive layer.

Further, the non-adhesive porous layer is made of an olefin-based resin.

Further, the non-adhesive porous layer has a porosity in a range of 30% to 85%.

Further, a heat capacity per unit area of the non-adhesive porous layer is smaller than a heat capacity per unit area of the adhesive layer.

Further, the adhesive label further includes a thermosensitive color-developing layer placed on a side of the support opposite to the adhesive layer.

Further, the non-adhesive porous layer is openable by heating so that the adhesive layer is exposed.

A label issuing device according to the present invention includes: a transporting part for transporting an adhesive label including a support, an adhesive layer placed on the support, and a porous layer placed on the adhesive layer; a recording part for performing recording on a side of the support opposite to the adhesive layer; and a heating part for opening the porous layer by heating so that the adhesive layer is exposed.

The adhesive label according to the present invention includes a support, an adhesive layer placed on the support, and a non-adhesive porous layer placed on the adhesive layer. This saves the labor for disposing of release paper because release paper is not discharged at a time of use, and the adhesive label of the present invention is excellent also in environmental resistance from the viewpoint of saving resources. Further, the porous layer has an anti-blocking property without adhesiveness, and thus, the adhesive label can be stored by being rolled into a roll shape. Further, the porous layer has a higher heat-shielding effect, compared with that of the same material. Therefore, the porous layer is excellent in controllability of a perforated area and an increase in sensitivity when the porous layer comes into contact with a heat source. Thus, the position of the surface of the adhesive layer to be exposed and the shape of the opening can be controlled with high precision.

BRIEF DESCRIPTION OF THE DRAWINGS

In the accompanying drawings:

FIG. 1 is a schematic vertical cross-sectional view of an adhesive label according to a first embodiment of the present invention;

FIGS. 2A to 2D are explanatory views illustrating a state in which the adhesive label according to the present invention exhibits adhesiveness;

FIGS. 3A and 3B are schematic plan views illustrating examples of openings formed in a porous layer of the adhesive label according to the present invention;

DETAILED DESCRIPTION OF THE PREFERRED EMBODIMENTS

First Embodiment

Figure 4:
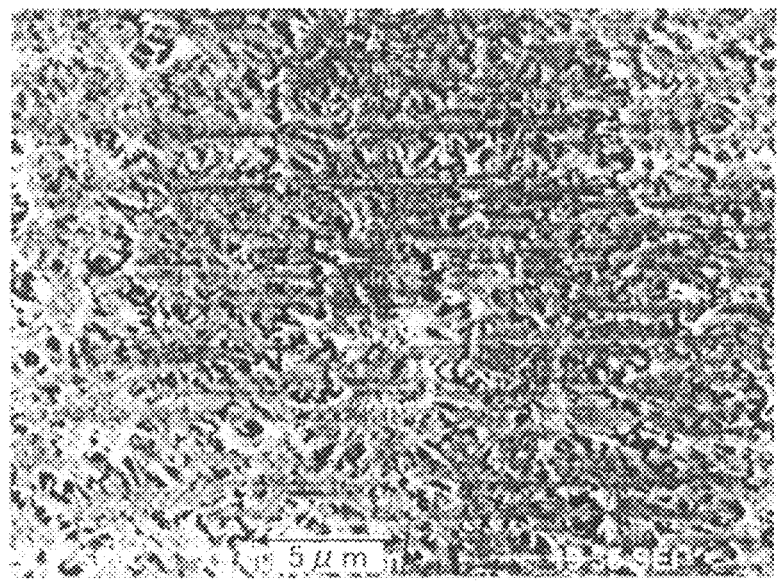
FIG. 4 is a photograph of a surface of the porous layer of the adhesive label according to the present invention, which is taken by a scanning electron microscope.

FIG. 1 is a schematic vertical cross-sectional view of an adhesive label 1 according to a first embodiment of the present invention. The adhesive label 1 has a configuration in which a print recording layer 2, a support 3, an adhesive layer 4, and a porous layer 5 are laminated from a lowermost surface. The adhesive label 1 of the present invention is allowed to exhibit adhesiveness by opening the porous layer 5 with heating to expose the adhesive layer 4. On the other hand, the porous layer 5 has non-adhesiveness and does not cause blocking even when the adhesive label 1 is stacked or rolled into a roll shape for storage. Characters, graphics, and the like can be printed on the print recording layer 2. For example, the print recording layer 2 is printed by using a label issuing device, and the porous layer 5 is opened by localized heating. Thus, the adhesive label 1 in which a particular portion of the adhesive layer 4 is exposed can be issued. It is noted that printing can be performed directly on the support 3, thereby obviating the need for forming the print recording layer 2.

The porous layer 5 has a heat capacity smaller than that of a layer made of the same material with a uniform thickness, which is not porous. Therefore, the porous layer 5 can be opened with heat energy lower than that of the same material that is not porous. The porous layer 5 is melted by heating and opened by a surface tension. In this case, the porous layer 5 has a material density smaller than that of the layer made of the same material, which is not porous. Further, a large number of holes are opened in the surface of the porous layer 5, and hence the contact area between the porous layer 5 and the adhesive layer 4 is smaller, compared with that of the same material, which is not porous. Therefore, the adhesive function of the adhesive material 4, which prevents the opening of the porous layer 5, is also low. Further, the opened porous layer 5 is provided with a convex part in an outer circumferential portion thereof in accordance with the volume of the melted porous material and the opening area. The porous layer 5 contains a large number of hollow regions, and hence, the porous layer has no thermal diffusibility, compared with the same material that is not porous. That is, the porous layer 5 has a high heat-shielding property, and heat is unlikely to spread in a planar direction of the porous layer 5. Therefore, an opening does not extend to a region outside the region with which a heating part H is in contact. As a result, adhesion characteristics of an adhesive label can be exhibited with high sensitivity, and the position and shape of an opening 8 can be controlled with high precision.

FIGS. 2A to 2D are explanatory views illustrating a state in which the adhesive label 1 according to the present invention exhibits adhesiveness. A thermal head 6 is used as heating means. As illustrated in FIG. 2A, the heating part H of the thermal head 6 is brought into contact with the porous layer 5 of the adhesive label 1. Then, as illustrated in FIG. 2B, the heated porous layer 5 starts being melted, and an opening 8 is formed in the porous layer 5 as illustrated in FIG. 2C. Thus, simultaneously with the formation of the opening 8, a convex part 7 higher than the surface of the porous layer 5 is formed on the periphery of the opening 8, and the underlying adhesive layer 4 is exposed through the opening 8. Then, as illustrated in FIG. 2D, when the print recording layer 2 is pressed from the bottom side thereof, an adhesive exposed through the opening 8 adheres to an adherend 9. The print recording layer 2 can be printed before or after the illustration of FIGS. 2A to 2D and the adhesive label 1 can be used as a label.

FIGS. 3A and 3B are schematic plan views illustrating examples of the openings 8 formed in the porous layer 5 of the adhesive label 1 according to the present invention. FIG. 3A illustrates a state in which nine openings 8 are formed so as to be aligned in a region R1 of the porous layer 5 by using the thermal head 6. FIG. 3B illustrates a state in which twelve openings 8 are formed so as to be aligned diagonally in a region R2 of the porous layer 5 by using the thermal head 6. In this manner, any opening pattern can be formed by arranging any number of the openings 8 in any direction at any position.

Here, a synthetic resin material can be used as the porous layer 5. It is preferred that the porous layer 5 have a porosity of 30% to 85% and an average hole diameter of 0.01 μm to 10 μm. The thickness of the porous layer 5 can be set to be in a range of 1 μm to 30 μm. It is preferred that the average hole diameter of the porous layer 5 be set to be smaller than the layer thickness of the porous layer 5 so that a through-hole is not formed. The thickness of the porous layer 5 is set to be preferably 30 μm or less. This reduces the heat capacity of the porous layer 5, with the result that the porous layer 5 can be opened with low heat energy. In the adhesive label 1 of the present invention, the heating part H and the adhesive layer 4 do not come into contact with each other due to the thickness of the opened porous layer 5 and the convex part 7. Thus, when the adhesive label 1 is moved relatively to the heating part H at the time of using the adhesive label 1 in a device, an adhesive does not adhere to the heating part H, and the transportability of the adhesive label 1 can be ensured. The temperature at which the porous layer 5 is opened by heating depends upon the material properties of the porous layer 5, and can be set to be about 100° C. to 200° C. This can address the energy saving of the device and the increase in sensitivity of the adhesive label.

The porous layer 5 can be configured in such a manner that the heat capacity per unit area thereof is smaller than that of the underlying adhesive layer 4 by using a synthetic resin material for the porous layer 5. That is, by configuring the upper porous layer 5 so that the heat capacity thereof becomes smaller than that of the underlying adhesive layer 4, an increase in temperature of the underlying adhesive layer 4 is suppressed, which can prevent the adhesive layer 4 from being deformed or denatured by heat.

As the support 3, a plastic material can be used. The support 3 may be made of any material that can support the print recording layer 2 to be formed on a lower surface thereof and the adhesive layer 4 to be formed on an upper surface thereof. For example, polypropylene, polyethylene, polystyrene, acrylic resin, or paper can be used.

As the adhesive layer 4, a pressure-sensitive adhesive can be used. The pressure-sensitive adhesive can adhere to an adherend merely by applying a small pressure at room temperature without using water, a solvent, or heat. Further, the pressure-sensitive adhesive adheres to an adherend strongly due to its cohesion force and elasticity, and can also be peeled off from a hard smooth surface. Specifically, a silicone-based adhesive, a rubber-based adhesive, or an acrylic adhesive can be used depending upon its intended use. The silicone-based adhesive can include silicone having a high cohesion force and silicone having a high adhesive strength. As the rubber-based adhesive, natural rubber, styrene-butadiene rubber (SBR), polyisobutylene, or a rubber-based material can be used. As the acrylic adhesive, a cross-linking material using a monomer with a low glass transition point and a cross-linking agent, or a non-cross-linking material obtained by copolymerizing a monomer with a low glass transition point and a monomer with a high glass transition point can be used.

In the case of a stretching process, the porous layer 5 can be formed, for example, by mixing and dispersing particles that vaporize in a material serving as a base and allowing the particles to vaporize. As the base, an olefin-based resin can be used. The olefin-based resin is used for many purposes as a general-purpose resin, and hence, can form the porous layer 5 at low cost. As the olefin-based resin, polyethylene (PE), polyvinyl chloride (PVC), polypropylene (PP), a multi-layer polyolefin-based resin in which PE and PP are stacked, polystyrene (PS), and polyethylene terephthalate (PET) can be used. As the olefin-based resin, a homopolymer, a copolymer, or a multistage polymer can be used. Polyolefin selected from the group consisting of the homopolymer, the copolymer, and the multistage polymer can also be used alone or in combination. Typical examples of the above-mentioned polymers include low-density polyethylene, linear low-density polyethylene, medium-density polyethylene, high-density polyethylene, ultrahigh molecular weight polyethylene, isotactic polypropylene, atactic polypropylene, polybutene, and ethylene propylene rubber.

Further, a hybrid that is a stack type of PS and PET, an ethylene/vinyl acetate copolymer (EVA) based resin, a polyvinyl alcohol (PVA) based resin, a polylactic acid (PLA) based resin that is a plant-based material, and the like can be used. Further, a cellulose-based material that can be expected to lower the cost can be used. It is preferred to select, as the porous layer 5, a material whose contact angle with the adhesive layer 4 to be adjacent to the porous layer 5 increases during heating. Further, in the case of selecting a stretching process for forming the porous layer 5, a uniaxially stretched or biaxially stretched material can be used. In the case of using a stretched film, there can be used a material which is stabilized by manipulating a glass transition point by copolymerizing a single monomer with another monomer or blending different kinds of components such as rubber.

The viscosity average molecular weight of the olefin-based resin is preferably 50,000 to 12,000,000, more preferably 50,000 to less than 2,000,000, most preferably 100,000 to less than 1,000,000. If the viscosity average molecular weight is 50,000 or more, the melt-tension at a time of melt molding becomes large to enhance moldability, which provides sufficient entanglement and tends to give high strength. If the viscosity average molecular weight is 12,000,000 or less, particularly, thickness stability is excellent.

FIG. 4 is a photograph of a surface of an example of the porous layer 5 to be applied to the adhesive label 1 according to the present invention, which is taken by a scanning electron microscope. The porous layer 5 is formed of an olefin-based resin. A large number of holes are formed in the surface of the porous layer 5. The hole diameter of these holes is about 2 μm or less.

As the print recording layer 2, a thermosensitive color-developing layer that develops color by heating can be used. For example, a thermosensitive recording layer coating solution is prepared by mixing a leuco dye with a developer that allows the leuco dye to develop color, and is applied to the print recording layer 2. A recording layer capable of recording by an inkjet recording apparatus may be used in place of the thermosensitive color-developing layer.

Next, a method of producing the adhesive label 1 is described. The adhesive label 1 is produced in the following manner. The porous layer 5 is attached to the support 3 coated with an adhesive or the support 3 with the adhesive layer 4 formed thereon. A coextrusion procedure can be used for the attachment. As a device for coating the support 3 with an adhesive, a bar coater, an airknife coater, a squeeze coater, a gravure coater, or the like can be used. At a time of coating, film viscosity, film thickness, and a drying process are selected appropriately. A plurality of layers of the support 3, the adhesive layer 4, and the porous layer 5 are attached, and hence a residual stress based on the thermal contraction and moisture absorption acts. The dimension stability, flatness of a surface, moisture resistance, solvent resistance, mechanical strength, friction coefficient of a surface, and flexibility at a time of contact with a heat source of the adhesive label 1 are to be noted.

Next, the exhibition of adhesive strength is described. The adhesive strength of the adhesive label 1 is exhibited when an adhesive comes into contact with the surface of an adherend through the openings 8. Here, a volume amount Q per unit time of the adhesive that flows out through the openings 8 is expressed as follows:

$$Q = 4\pi Pa/(8L\eta_0)$$

where P represents a pressure to be applied to the adherend, a represents a radius of the opening 8, L represents a distance of the opening 8 (height of the convex part 7 from the boundary between the porous layer 5 and the adhesive layer 4), and $\eta_0$ represents the viscosity of the adhesive. It is understood from the expression that, as the viscosity $\eta_0$ is larger and the distance L of the opening 8 is larger, the amount of the adhesive that flows out through the openings 8 becomes smaller. Thus, it is necessary to select the thickness of the porous layer 5 and the viscosity of the adhesive appropriately. In the adhesive label 1 of the present invention, the radius a of the opening 8 can be controlled with high precision, and hence, the controllability of the amount of the adhesive that flow out through the openings 8 is enhanced, and predetermined adhesive strength can be exhibited stably.

Second Embodiment

Figure 5:
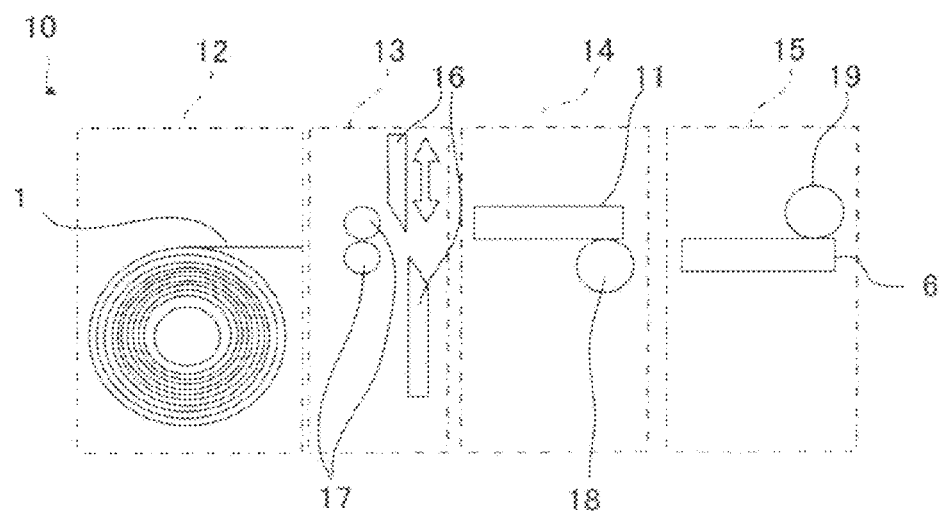
FIG. 5 is a schematic structural view of a label issuing device according to a second embodiment of the present invention.

FIG. 5 is a schematic structural view of a label issuing device 10 according to a second embodiment of the present invention. The label issuing device 10 includes a roll paper accommodating part 12 for accommodating the adhesive label 1, a roll paper cutting part 13 for cutting the adhesive label 1, a label recording part 14 as a recording part for recording on the adhesive label 1, and an adhesiveness exhibiting part 15 for allowing the adhesive label 1 to exhibit adhesiveness. The roll paper accommodating part 12 accommodates the adhesive label 1 rolled into a roll shape. The adhesive label 1 has a laminated structure in which the print recording layer 2, the support 3, the adhesive layer 4, and the porous layer 5 are laminated. The roll paper cutting part 13 cuts the adhesive label 1 sent from transporting rollers 17 as a transporting part to a predetermined length by a cutter member 16. The label recording part 14 performs recording by a recording thermal head 11 on the print recording layer 2 of the adhesive label 1 placed on a transporting roller 18. As already described in the first embodiment, the adhesiveness exhibiting part 15 heats the porous layer 5 of the adhesive label 1 placed on a transporting roller 19 by the thermal head 6 as the heating part H to expose the underlying adhesive layer 4.

Here, the thermal head 6 is configured by arranging a plurality of heat-generating parts in parallel, and thus, can form a plurality of openings 8 simultaneously so that the openings 8 are arranged in parallel. Further, a plurality of openings 8 can be formed continuously in the transport direction of the adhesive label 1. Specifically, a required number of openings 8 can be formed at required positions of the adhesive label 1. That is, the position and size of a region in which the adhesive label 1 is allowed to exhibit adhesiveness can be set. Further, the size of the openings 8 can be controlled with high precision, and hence, the adhesive strength can be exhibited stably.

Further, when the openings 8 are provided in the porous layer 5, a gap is formed between the heating part H of the thermal head 6 and the upper surface of the adhesive layer 4 due to the thickness of the porous layer 5 or the convex part 7 interposed on the periphery of each opening 8. Therefore, the transportability of the adhesive label 1 can be kept without allowing the adhesive layer 4 to adhere to the thermal head 6. Further, the adhesive label 1 according to the present invention can exhibit adhesiveness by opening the porous layer 5 with low energy, which is preferred for configuring a portable label issuing device 10.

Figure 6:
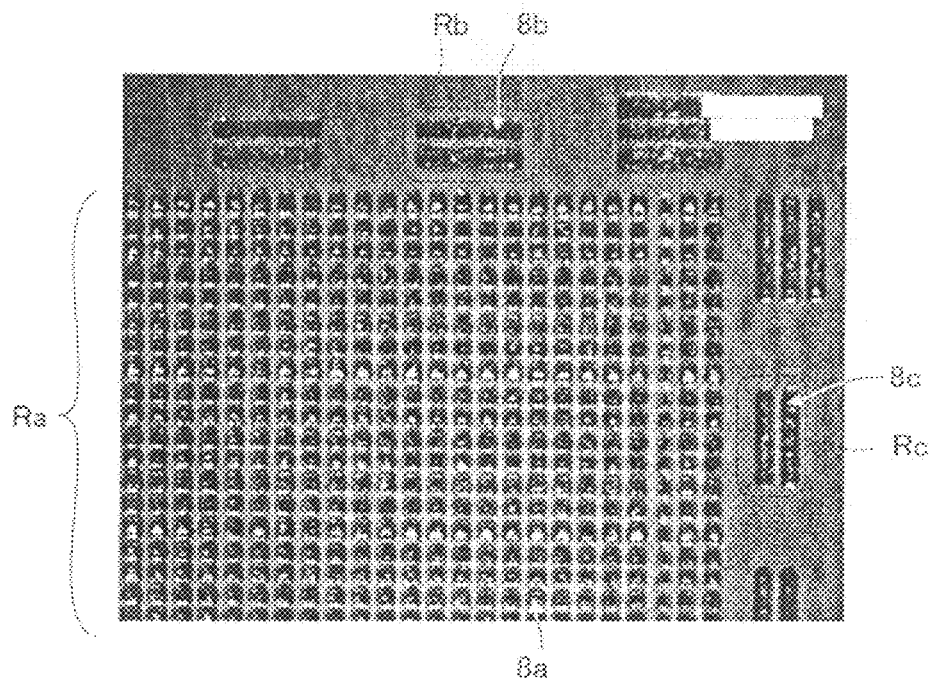
FIG. 6 is a photograph of openings formed by the label issuing device of the present invention.
Figure 7:
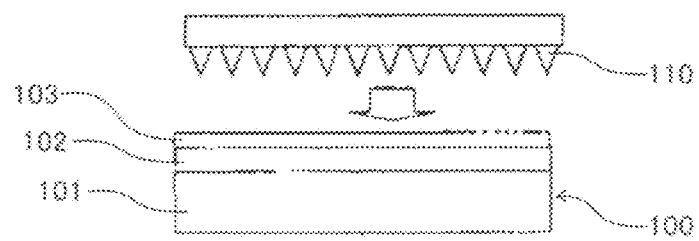
FIG. 7 is a schematic view of a conventionally known label issuing device.

FIG. 6 is a photograph of the surface of the porous layer 5 of the adhesive label 1 issued by the label issuing device 10 illustrated in FIG. 5. The adhesive label 1 moves from an upper side to a lower side, and a plurality of heat generators of a thermal head are arranged in a horizontal direction. A region Ra includes openings 8a formed by allowing the plurality of heat generators of the thermal head to generate heat alternately and allowing the heat generators to generate heat every other dot intermittently. A region Rb includes openings 8b in a block shape formed by allowing the heat generators of the thermal head to generate heat continuously in a lateral direction. A region Rc includes openings 8c in a block shape formed by allowing the heat generators of the thermal head to generate heat continuously in time sequence. Thus, a required number of the openings 8 can be formed at required positions, and hence, optimum adhesiveness can be provided depending upon the properties of an adherend.

What is claimed is:

1. An adhesive label, comprising:
   a support;
   an adhesive layer placed on the support; and
   a stretched non-adhesive porous layer placed on the adhesive layer and being openable by heating to expose the adhesive layer.

2. An adhesive label according to claim 1, wherein the stretched non-adhesive porous layer is made of an olefin-based resin.

3. An adhesive label according to claim 1, wherein the stretched non-adhesive porous layer has a porosity in a range of 30% to 85%.

4. An adhesive label according to claim 2, wherein the stretched non-adhesive porous layer has a porosity in a range of 30% to 85%.

5. An adhesive label according to claim 1, wherein a heat capacity per unit area of the stretched non-adhesive porous layer is smaller than a heat capacity per unit area of the adhesive layer.

6. An adhesive label according to claim 4, wherein a heat capacity per unit area of the stretched non-adhesive porous layer is smaller than a heat capacity per unit area of the adhesive layer.

7. An adhesive label according to claim 1, further comprising a thermosensitive color-developing layer placed on a side of the support opposite to the adhesive layer.

8. An adhesive label according to claim 6, further comprising a thermosensitive color-developing layer placed on a side of the support opposite to the adhesive layer.

9. A label issuing device, comprising:
   a transporting part for transporting the adhesive label of claim 1;
   a recording part for performing recording on a side of the adhesive label opposite to the adhesive layer; and
   a heating part for opening the stretched non-adhesive porous layer of the label by heating so that the adhesive layer is exposed.

10. A label issuing device according to claim 9, wherein the heating part is configured to be brought into contact with and melt the stretched non-adhesive porous layer so that the at least one opening is formed in the stretched non-adhesive porous layer and the adhesive layer is exposed through the at least one opening.

11. A label issuing device according to claim 10, wherein the at least one opening comprises a plurality of openings through which the adhesive layer is exposed.

12. A label issuing device according to claim 9, wherein the at least one opening comprises a plurality of openings through which the adhesive layer is exposed.

13. A label issuing device according to claim 9, wherein the heating part is configured to apply localized heating to the stretched non-adhesive porous layer so that a preselected portion of the adhesive layer is exposed.

14. A label issuing device according to claim 13, wherein the heating part is configured to be brought into contact with and melt the stretched non-adhesive porous layer so that at least one opening is formed in the stretched non-adhesive porous layer and the adhesive layer is exposed through the at least one opening.

15. A label issuing device according to claim 14, wherein the at least one opening comprises a plurality of openings through which the adhesive layer is exposed.

16. An adhesive label comprising:
   a support;
   an adhesive layer placed on the support; and
   a non-adhesive porous layer placed on the adhesive layer and configured to be heated by localized heating so that at least one selected portion of the adhesive layer is exposed.

17. An adhesive label according to claim 16, wherein the at least one selected portion of the adhesive layer is exposed through at least one opening that is formed in the non-adhesive porous layer by the localized heating.

18. An adhesive label according to claim 16, wherein the non-adhesive porous layer is made of an olefin-based resin.

19. An adhesive label according to claim 16, wherein the non-adhesive porous layer has a porosity in a range of 30% to 85%.

20. An adhesive label according to claim 16, wherein the non-adhesive porous layer is made of a uniaxially stretched or biaxially stretched material.

\* \* \* \* \*